United States Patent [19]
Ishii et al.

[11] Patent Number: 5,898,927
[45] Date of Patent: *Apr. 27, 1999

[54] AUTONOMOUS CHANNEL REUSE IN CELLULAR MOBILE COMMUNICATION WITH SUBSEQUENT POWER CONTROL

[75] Inventors: Kenichi Ishii; Tomoki Ohsawa, both of Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/577,814

[22] Filed: Dec. 22, 1995

[30] Foreign Application Priority Data

Dec. 22, 1994 [JP] Japan .................................. 6-320724

[51] Int. Cl.$^6$ ........................................................ H04B 7/26
[52] U.S. Cl. ........................ 455/450; 455/509; 455/522; 455/63
[58] Field of Search ................................ 455/33.1, 34.1, 455/34.2, 62, 63, 127, 447, 450, 452, 509, 522, 436, 437, 446, 451, 453, 69, 70, 67.1

[56] References Cited

FOREIGN PATENT DOCUMENTS

| | | |
|---|---|---|
| 4-351126 | 12/1992 | Japan . |
| 5-110500 | 4/1993 | Japan . |

OTHER PUBLICATIONS

T. Kanai, "Autonomous Reuse Partitioning in Cellular Systems", reprinted from VTS Forty–Second Conf. Frontiers of Technology, Denver, Colorado, May 10–13, 1992, pp. 782–785.

*Mobile Cellular Telecommunications Systems*, William C. Y. Lee, McGraw–Hill Book Company (1989), pp. 259–260.

Ken–ichi Ishii et al., "Dynamic Channel Alloction Algorithm with Transmitter Power Control", Record of the Forty–fourth IEEE Vehicular Technology Conference (1994), pp. 838–842.

*Primary Examiner*—Nguyen Vo
*Assistant Examiner*—Lester G. Kincaid
*Attorney, Agent, or Firm*—Sughrue, Mion, Zinn, Macpeak & Seas, PLLC

[57] ABSTRACT

In each cell of a plurality of cells of a mobile communication network assigned with a predetermined number of radio channels, a base station allocates to a call one of the radio channels according to autonomous channel reuse partitioning as a communication channel on transmitting messages to and from a mobile unit which is currently present alive in the cell under consideration. For use as the communication channel, the radio channel should preferably have a base and a mobile carrier to interference ratio which is equal to or greater than a first allocation threshold level determined by a sum of a power control margin for base and mobile transmission powers and a second allocation threshold level determined to be sufficient for transmission of the messages. If such a radio channel is not available, another of the radio channels is used as the communication channel that has the base and the mobile carrier to interference ratios both equal to or greater than the second allocation threshold level. It is thereby rendered possible to control the mobile transmission power after allocation of the communication channel and furthermore the base transmission power.

9 Claims, 6 Drawing Sheets

AUTONOMOUS CHANNEL REUSE IN CELLULAR MOBILE COMMUNICATION WITH SUBSEQUENT POWER CONTROL

BACKGROUND OF THE INVENTION

This invention relates to cellular mobile communication and to a base station and a mobile unit for use in the cellular mobile communication.

In general, a cellular mobile communication network has an overall service area divided into a plurality of cells and is assigned with a plurality of radio channels. Each channel is reused in different cells which are sufficiently remote from one another. Such a reuse of the radio channels is effective in raising an efficiency of use of a frequency band of such radio channels. The mobile communication network is, for example, an automobile communication network or a portable telephone network and comprises a great number of mobile units.

Usually, a base station is placed in each cell. A mobile unit is movable from one to another of the cells and may currently be present in one of the cells in which is placed the base station under consideration which will be called herein a particular cell merely for brevity of the description. To a call originating either in the base station or in the mobile unit, the base station allocates one of the radio channels as a communication channel for use in communication between the base station and the mobile unit. The communication channel is allocated either by a fixed channel allocation scheme or by a dynamic channel allocation scheme.

According to the fixed channel allocation scheme, the radio channels are preliminarily allocated to the cells in consideration of propagation characteristics of radio signals of respective radio channels so as to give rise to little interference to communication channels in respective cells. The fixed channel allocation scheme is used in the automobile communication network and in the portable telephone network.

In accordance with the fixed channel allocation scheme, a reuse distance of each radio channel is determined primarily based on a carrier to interference ratio (C/R) in a cell edge adjacent in each cell to contiguous cells. An improved fixed channel allocation method is described by William C. Y. Lee in "Mobile Cellular Telecommunications Systems" published 1989 by McGraw-Hill Book Company, Subchapter 8.5 Fixed Channel Assignment. This technique is called reuse partitioning.

According to the dynamic channel allocation scheme, a certain one of the radio channels is selected so as to avoid interference caused to the communication channel by other channels which are currently used in communication in nearby cells. Although the manner of selection is somewhat complicated, all radio channels of the mobile communication network can be used unless the interference is objectionable. It is consequently possible to concurrently deal with a great number of communications. The dynamic channel allocation scheme is therefore prosperous for use in the automobile communication network, the portable telephone network, an outdoor cordless telephone network, and a like mobile communication networks.

An example is disclosed by Toshihiko Kanai in Japanese Patent Prepublication (A) No. 351,126 of 1992 and in a paper he contributed to the Conference Record of the Forty-second IEEE Vehicular Technology Society (VTS), pages 782 to 785, under the title of "Autonomous Reuse Partitioning in Cellular Systems". Another example is revealed also by Toshihiko Kanai in Japanese Patent Prepublication (A) No. 110,500 of 1993. In this latter example, the communication channel is switched from one to another of the radio channels when the interference is objectionable.

In accordance with the autonomous reuse partitioning, an identical ordering of channels is used in common to the cells. As the communication channel, one of the radio channels is allocated that has a carrier to interference ratio exceeding first in the identical ordering an allocation reference level capable of allowing the reuse of radio channels in the particular cell. No cooperative control is necessary. That is, the base station transmits its radio signals through such communication channels with no control on a base station power. This undesirably results in frequent call losses and forced interruptions of the communication channels, namely, forced cut offs of messages being transmitted through the communication channels.

Still another example is proposed in a paper contributed by Ken-ichi Ishii, one of the present joint inventors, and another to the Record of the Forty-fourth IEEE VTC (Vehicular Technology Conference), 1994, pages 838 to 842, under the title of "Dynamic Channel Allocation Algorithm with Transmitter Power Control". According to this Ishii et al paper, one of the radio channels is allocated as the communication channel by merely applying to the carrier to interference ratio a first allocation threshold level equal to a sum of a power control range and a second allocation threshold level which allows the reuse of radio channels in the particular cell like the allocation reference level described above. If this one of the radio channels is not available, another of the radio channels is selected that has a carrier to interference ratio greater than the second location threshold level.

In accordance with the Ishii et al paper, no attention is directed to the identical ordering. The power control range is therefore wide. In fact, the Ishii et al paper refers to power control ranges at the base station and the mobile unit.

SUMMARY OF THE INVENTION

It is consequently an object of the present invention to provide a method of allocating a channel of a plurality of radio channels of a cellular mobile communication network, in accordance with autonomous channel reuse partitioning, with transmission power control at each of base stations and mobile units of the network.

It is another object of this invention to provide a method which is of the type described and in which a power control margin is optimally wide to reduce power consumption in, above all, each mobile unit.

It is still another object of this invention to provide a method which is of the type described and in which it is possible to control a base transmission power besides a mobile transmission power and to avoid frequent occurrence of a call loss and of forced interruption.

It is a different object of this invention to provide a base station which is operable according to a method of the type described.

It is another different object of this invention to provide a mobile unit to which it is possible to apply a method of the type described.

Other objects of this invention will become clear as the description proceeds.

In accordance with an aspect of this invention, there is provided a method of allocating a channel of a plurality of radio channels of a mobile communication network comprising a base station in each cell of a plurality of cells and a mobile unit in the above-mentioned each cell to a call in an allocating order common to the cells as a communication channel, which method comprises the steps of measuring at the base station base carrier to interference ratios and for the mobile unit mobile carrier to interference ratios, selecting the communication channel from the radio channels based on the base and the mobile carrier to interference ratios, and controlling a base and a mobile transmission power in consideration of the base and the mobile carrier to interference ratios, wherein the selecting step comprises the steps of: (A) allocating a first one of the radio channels as the communication channel that first exceeds a first allocation threshold level determined by a sum of a power control margin and a second allocation threshold level determined by the base and the mobile carrier to interference ratios; and (B) allocating, if the above-mentioned first one of radio channels is not available, a second one of the radio channels that is not less than the second allocation threshold level.

In accordance with a different aspect of this invention, there is provided a base station which is for use in each cell of a plurality of cells of a mobile communication system additionally comprising a mobile unit in the above-mentioned each cell in allocating to a call in an allocating order common to the cells as a communication channel a channel of a plurality of radio channels assigned to the mobile communication network and which comprises means for measuring base carrier to interference ratios and for the mobile unit mobile carrier to interference ratios, means for selecting from the radio channels the communication channel based on the base and the mobile carrier to interference ratios, and means for controlling a base and a mobile transmission power in consideration of She base and the mobile carrier to interference ratios, wherein the selecting means comprises: (A) first means for allocating a first one of the radio channels as the communication channel that first exceeds a first allocation threshold level determined by a sum of a power control margin and a second allocation threshold level determined by the base and the mobile carrier to interference ratios; and (B) second means for allocating, if the above-mentioned first one of radio channels is not available, a second one of the radio channels that is not less than the second allocation threshold level.

In accordance with another different aspect of this invention, there is provided a mobile unit movable from one to another of a plurality of cells of a mobile communication network assigned with a plurality of radio channels and comprising a base station placed in each cell of the cells and allocating to a call in an allocating order common to the cells as a communication channel, while the mobile unit is present in the above-mentioned each cell, a first one of the radio channels that has a base and a mobile carrier to interference ratio first exceeding a first allocation threshold level determined by a sum of a power control margin and a second allocation threshold level determined by the base and the mobile carrier to interference ratios and, if the above-mentioned first one of radio channels is not available, a second one of the radio channels that has a base and a mobile carrier to interference ratio not less then the second allocation threshold level, wherein the mobile unit comprises for operation after the communication channel is allocated: (A) means for calculating a mobile power control value by subtracting the second allocation threshold level from a base carrier to interference ratio used in allocating the communication channel; (B) means for checking whether or not the mobile power control value is greater than the power control margin; and (C) means for controlling the mobile transmission power by reducing the power control margin and the mobile power control value when the mobile power control value is and is not greater than the power control margin, respectively.

DESCRIPTION OF THE PREFERRED EMBODIMENT

Figure 1:
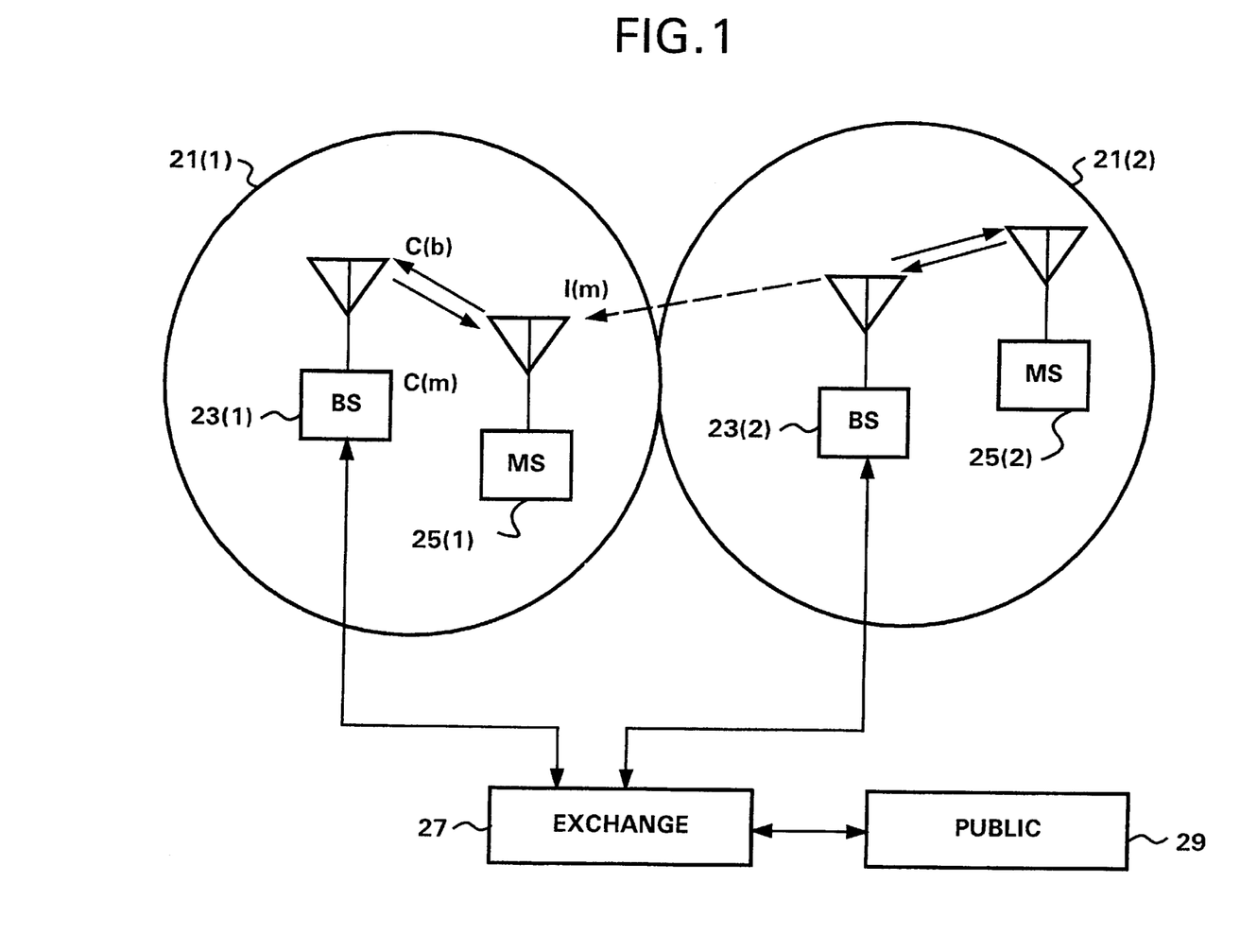
FIG. 1 is a schematic partial top view of a cellular mobile communication network in general.

Referring to FIG. 1, a cellular mobile communication network has an overall or total service area. To such a communication network applicable is a channel allocating method according to the present invention. A plurality, N in number, of radio channels are assigned to the mobile communication network, where N represents a predetermined channel number. The radio channels have different frequencies in a frequency band and will be identified as first through N-th channels CH(1) to CH(N). Each or one of the radio channels will be called an n-th channel CH(n), where n represents a channel identification number and is variable between 1 and N, both inclusive.

The overall service area is divided into a plurality of cells 21, such as a first cell 21(1) and a second cell 21(2). Merely for convenience of illustration, the cells 21 are depicted by circles having a common diameter and only a point common to their cicumferences, A base station (BS) 23 is placed usually in each cell 21. A great number of mobile units (MS) 25 are movable from one to another of the cells 21. The base stations 23 are connected to an exchange office or a central or control station 27 connected to a fixed communication network, such as a public communication network 29.

In the example being illustrated, a first base station 23(1) is in the first cell 21(1). A second base station 23(2) is in the second cell 21(2). A first mobile unit 25(1) is currently present in the first call 21(1) and a second mobile unit 25(2), in the second cell 21(2). In order to establish a communication channel for transmission of messages, the first base station 23(1) allocates one of the radio channels as the communication channel to and from the first mobile unit 25(1). Arriving at the first mobile unit 25(1), the communication channel will be referred to as a downward channel. Reaching the first base station 23(1), the communication channel will be called an upward channel. Through the downward channel, the first base station 23(1) transmits a downward radio signal with a base transmission power P(b). Through the upward radio channel, an upward radio signal is transmitted from the first mobile unit 25(1) with a mobile transmission power P(m). In one communication channel, the downward and the upward radio signals may have different frequencies.

At the first base station 23(1), the upward radio signal is received with a base or upward carrier level C(b). To the first mobile unit 25(1), the downward radio signal reaches with a mobile or downward carrier level C(m). In the meanwhile, the second base station 23(2) may allocate a different one of the radio channels for communication with the second mobile unit 25(2). At a certain cell distance which is called a reuse distance, the base station or stations 23 can allocate, in at least one of the cells 21, one of the radio channels that is in use in the first cell 21(1). Such a communication channel gives rise at the first base station 23(1) a base or upward interference level I(b) and at the first mobile unit 25(1) a mobile or downward interference level I(m). Under the circumstances, the communication channel has at the first base station 23(1) a base or upward carrier to interference ratio C/I(b) and at the first mobile unit 25(1) a mobile or downward carrier to interference ratio C/I(m). When two or more of the mobile units 25 are concurrently present in the first cell 21(1), the first base station 23(1) allocates two or more communication channels to respective ones of such mobile units 25. When the carrier and the interference levels are measured in decibels (dB), the base and the mobile carrier to interference ratios C/I(b) and C/I(m)(dB) are equal to (C(b)-I(b)) and (C(m)-I(m)).

Figure 2:
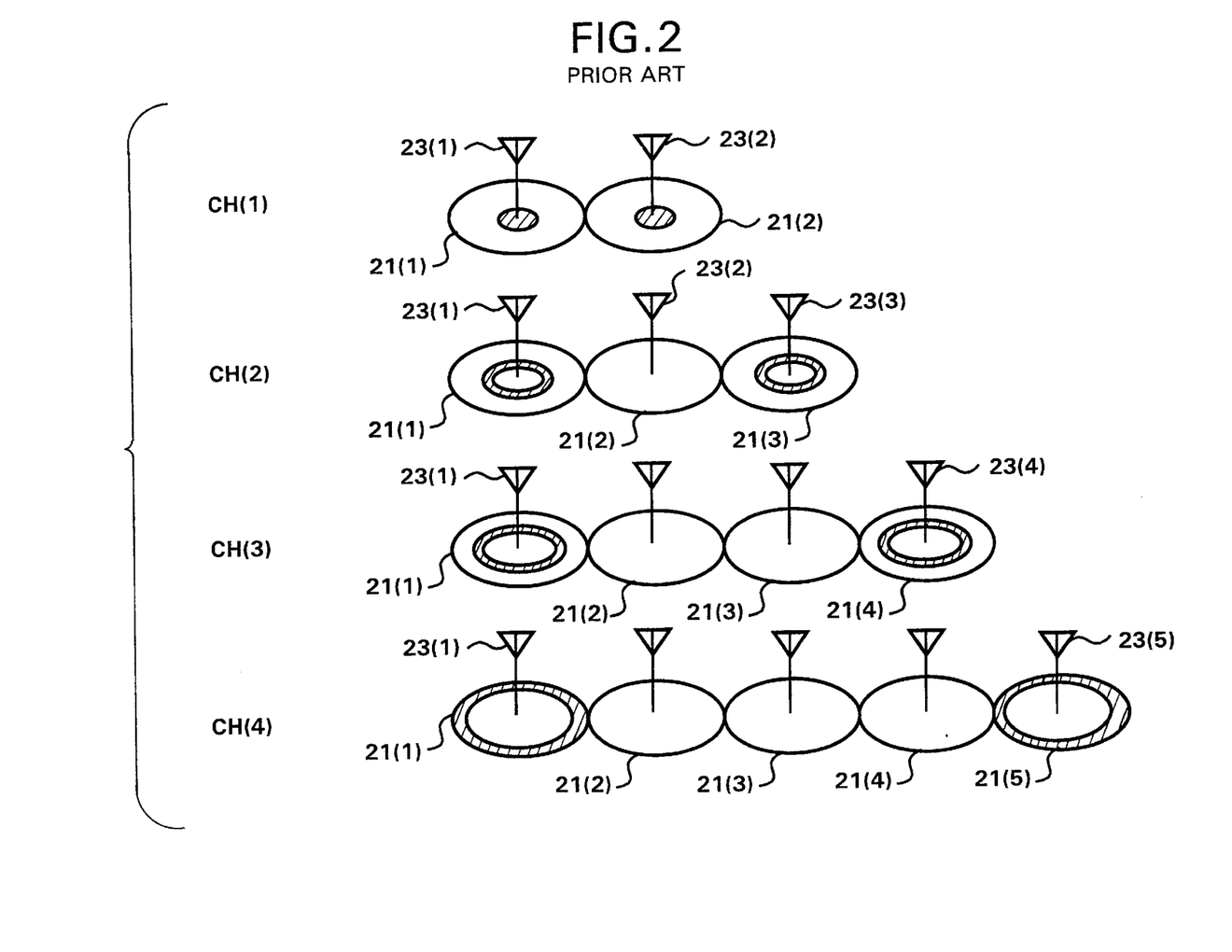
FIG. 2 is a schematic perspective view of a cellular mobile communication network for use in describing operation, in connection with four radio channels, according to an autonomous channel reuse partitioning scheme known in the art.

Turning to FIG. 2, a conventional channel allocating method will be described. This channel allocating method is described as an autonomous channel reuse partitioning algorithm in the Kanai paper mentioned hereinabove and is used also in the channel allocating method according to this invention. In a cellular mobile communication network illustrated in FIG. 2, similar parts are designated by like reference numerals and are similarly operable with likewise named signals and with likewise named levels and powers.

In FIG. 2, an identical ordering of the radio channels is used in the cells 21. In other words, an allocating order of the radio channels is used in common to the cells 21. It will be presumed that the first through the N-th channels CH(1) to CH(N) are serially numbered in this order of allocation. Manners of reuse of the first through the fourth channels CH(1), CH(2), CH(3), and CH(4) are exemplified together with the first through the fifth cells 21(1), 21(2), 21(3), 21(4), and 21(5) which are depicted as ellipses together with the first through the fifth base stations 23(1), 23(2), 23(3), 23(4), and 23(5). Although not depicted, at least first through fourth mobile units are currently present in the first cell 21(1) successively distant from the first base station 23(1). Along a first or top row through a fourth or bottom row indicated by labels CH(1) to CH(4), mobile units are present in the second through the fifth cells 21(2) to 21(5), at least one mobile unit in each of these cells 21(2) through 21(5).

The first channel CH(1) is allocated by the first base station 23(1) as the communication channel to the first mobile unit and is reused by the second base station 23(2) in communication to and from the mobile unit in the second cell 21(2). Similarly, the second channel CH(2) is allocated in the first cell 21(1) to the second mobile unit and is reused by the third base station 23(3) for communication with the mobile unit in the third cell 21(3). The third channel CH(3) is allocated in the first cell 21(1) to the third mobile unit and is reused by the fourth base station 21(4) for communication with the mobile unit in the fourth cell 21(4). The fourth channel CH(4) is allocated by the first base station 23(1) to the fourth mobile unit in a cell edge of the first cell 21(1) and is reused by the fifth base station 23(5) for communication with the mobile unit in the fifth cell 21(5). In the first cell 21(1), the first channel gives high base and mobile carrier levels and can consequently be reused at a short reuse distance from the second cell 21(2). The fourth channel gives low base and mobile carrier levels and can therefore be reused at a long reuse distance in the fifth cell 21(5). It is presumed here that communication channels are not in use by other base stations and mobile units other than those mentioned in specific conjunction with the first through the fourth channels.

Figure 3:
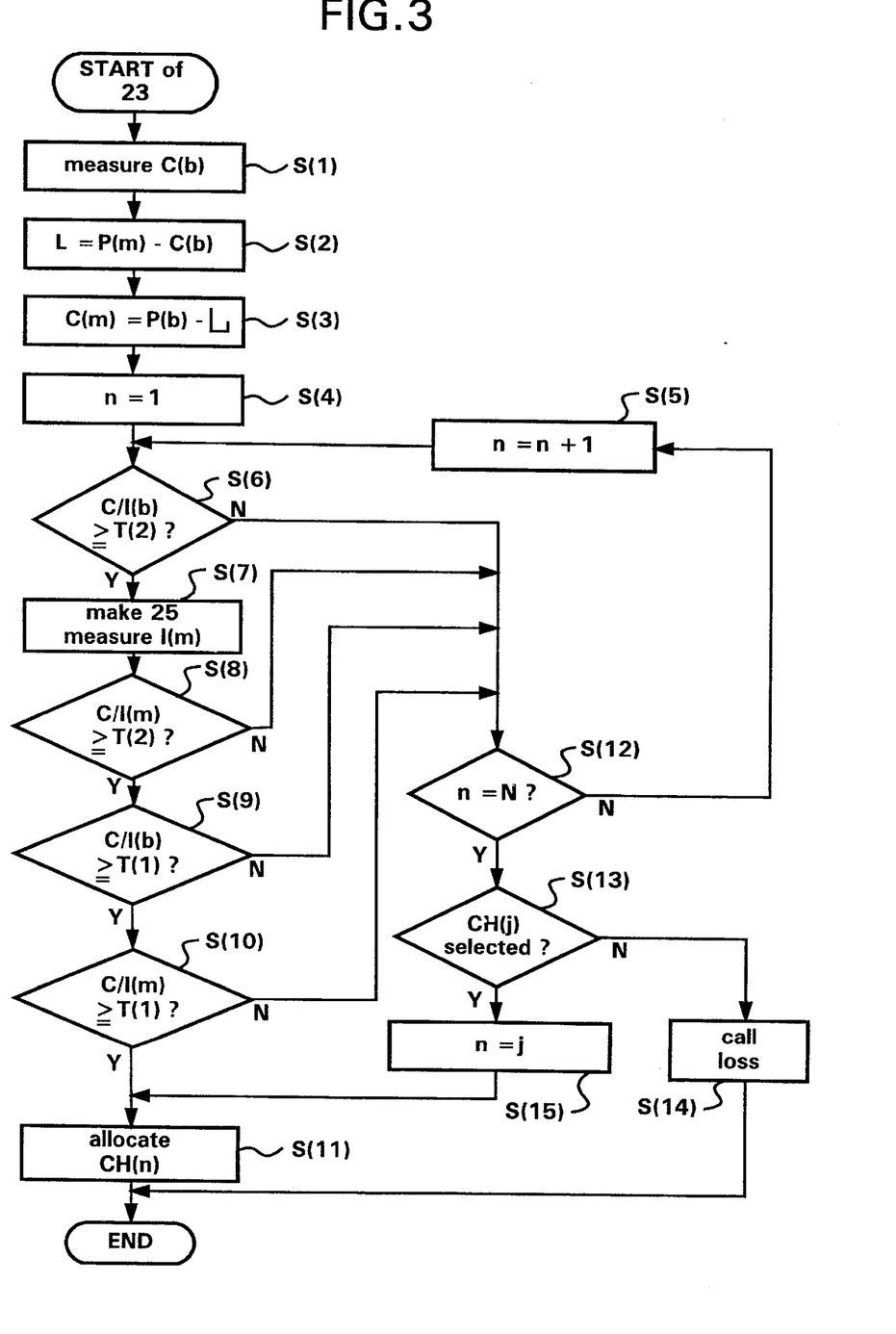
FIG. 3 shows a flow chart for use in describing a channel allocating method for use in, according to an embodiment of the instant invention, the mobile communication network illustrated in FIG. 1.

Referring now to FIG. 3 with FIGS. 1 and 2 continuously referred to, the description will proceed to a channel allocating method according to a preferred embodiment of this invention. It is possible to assume that each base station 23 transmits the radio signals with a predetermined base transmission power P(b) and snows the mobile transmission power P(m) of each mobile unit 25 in one of the cells 21 that is related to the base station under consideration as a particular cell. On allocating a communication channel, the base station 23 refers to a first allocation threshold level T(1) equal to a sum of a power control margin or range P(mar) and a second allocation threshold level T(2) which is the allocation reference level described heretobefore. While some of the radio channels CH(1) through CH(N) are not used in the particular cell as the communication channels and are left free as idle channels, the base station 23 repeatedly measures the base interference level I(b) of each idle channel for storage in the base station 23.

A call or a request for call may originate either at one of the mobile station 25 or at the base station 25 in response to a call originating in the public telecommunication network 29. The base station 23 receives through a control channel a call request signal representative of the call originating at the mobile unit 25 present in the particular cell. Alternatively, the base station 23 receives a call acknowledge signal in response to the call originating thereat from the mobile unit 25 which is currently present in the particular cell and to which the call is directed. The base station 23 measures the base carrier level C(b) of either the call request signal or of the call acknowledge signal at a first step S(1) for storage in the base station 23. At a second step S(2), the base carrier level is subtracted from the mobile transmission power P(b) to get a propagation loss L between the base station 23 and the mobile unit 25 present at a certain spot in the particular cell. It is possible to understand at this instant that the propagation loss is common to the upward and the downward channels. The mobile carrier level C(m) can therefore be calculated at the base station 23 by subtracting at a third step S(3) the propagation loss from the base transmission power P(b).

The base station 23 allocates one of the first through the N-th channels to the mobile unit 25 as the communication channel in the allocating order as follows. At a fourth step S(4), the channel identification number n is set at 1. Later at a fifth step S(5), one is added to the channel identification number. In due course, the channel indentification number becomes equal in general to n to indicate the n-th channel CH(n).

At a sixth step S(6), the base station 23 checks whether or not the base carrier to interferenne ratio C/I(b) is equal to or greater than the second allocation threshold level T(2). Even if the base carrier to interference ratio is greater than or equal to the second allocation threshold level, the mobile unit 25 may be present at or near the cell edge of the particular cell and receives the radio signal in the n-th channel used in nearby cells with a high mobile interference level. The base station 23 consequently makes at a seventh step S(7) the mobile unit 25 measure the mobile interference level I(m) as regards the n-th channel and receives the mobile interference level to check at an eighth step S(8) whether or not the mobile carrier to interference ratio C/I(m) is equal to or greater than the second allocation threshold level. If the base and the mobile carrier to interference ratios are both equal to or greater than the second allocation threshold level, the n-th channel would be an idle channel for the particular cell.

In order to enable control of the mobile and the base transmission powers in the manner which will presently be described, the base station 23 checks at ninth and tenth steps S(9) and S(10) whether or not the base and the mobile carrier to interference ratios are equal to or greater than the first allocation threshold level T(1), respectively. If the base and the mobile carrier to interference ratios are both equal to or greater than the first allocation threshold level, the n-th channel is allocated at an eleventh step S(11) as the communication channel in accordance with an autonomous channel reuse partitioning algorithm with power control, namely, with this invention. Channel allocation comes to an end.

If either the base or the base and the mobile carrier to interference ratios are not greater than the first allocation threshold level, the base station 23 checks at a twelfth step S(12) whether or not the channel identification number is equal to the channel number N. If the channel identification number is not yet equal to the channel number, the fifth step is carried out to increment the channel identification number. If the channel identification number is equal to the channel number, a selected number j is selected from those of the channel identification numbers 1 to N, both inclusive, each of which identifies a j-th channel CH(j) having the base and the mobile carrier to interference ratios equal to or greater than the second allocation threshold level at the sixth and the eighth steps. The base station 23 checks at a thirteenth step S(13) whether or not such a j-th channel is actually present. If the j-th channel can not be located, namely, j=0, the call is decided at a fourteenth step to be a call loss. If successfully selected, the j-th channel is allocated as the communication channel. The selected number is therefore deemed at a fifteenth step S(15) to be equal to n.

Figure 4:
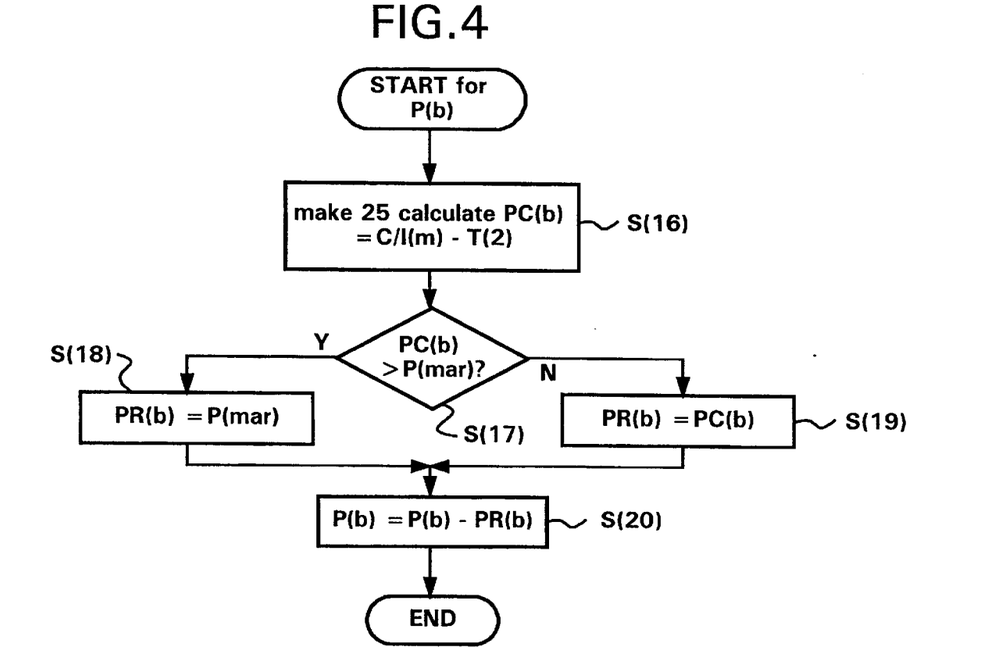
FIG. 4 shows a flow chart for use in describing operation of a base station used in the mobile communication network operable in accordance with the flow chart depicted in FIG. 3.

Turning to FIG. 4 with FIGS. 1 through 3 continuously referred to, the base station 23 controls the base transmission power P(b) after the communication channel is allocated at the eleventh step S(11). In FIG. 4, steps will be counted consecutively following the fifteenth step S(15).

At a sixteenth step S(16), the base station 23 makes the mobile unit 25 calculate a base power control value PC(b) by subtracting the second allocation threshold level T(2) from the mobile carrier to interference ratio C/I(m) used in judging at the eighth step S(8) to be either equal to or greater than the second allocation threshold level. At a seventeenth step S(17), the base station 23 receives the base power control value from the mobile unit 25 and checks whether or not the base power control value is greater than the power control margin P(mar). If the base power control value is greater than the power control margin, the power control margin is used at an eighteenth step S(18) as a base power reduction value PR(b). If the base power control value is not greater than the power control margin, the base power control value is used at a ninteenth step S(19) as the base power reduction value as it stands. At a twentieth step S(20), the base poser reduction value is reduced from the base transmission power to provide a controlled base transmission power.

It is possible at the sixteenth step to make the base station 23 receive from the mobile unit 25 the mobile interference level I(m) and calculate the mobile carrier to interference ratio and the base power control value. In this event, the base station 23 need not receive at the seventeenth step the base power control value from the mobile unit 25.

Figure 5:
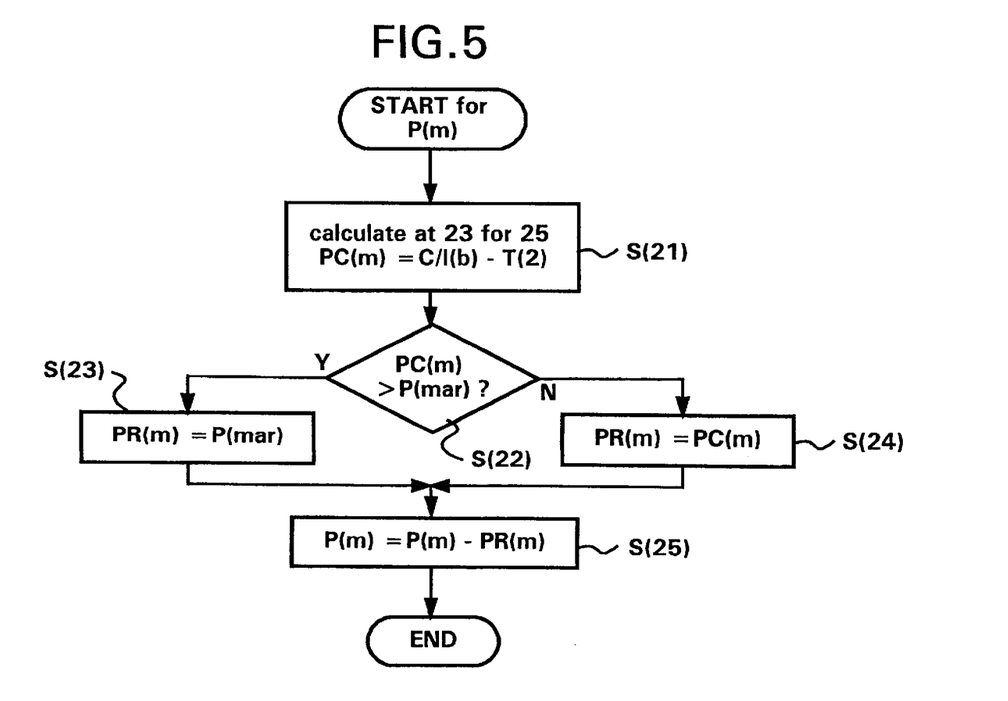
FIG. 5 shows a flow chart for use in describing operation of a mobile unit used in the mobile communication network operable in accordance with the flow chart of FIG. 3.

Further turning to FIG. 5 with FIGS. 1 through 3 continuously referred to, the base station 23 makes the mobile unit 25 control the mobile transmission power P(m) after the communication channel is allocated at the eleventh step S(11). Steps will be counted consecutively following the twentieth step S(20) described in conjunction with FIG. 4.

At a twenty-first step S(21), the base station 23 calculates a mobile power control value PC(m) by subtracting the second allocation threshold level T(2) from the base carrier to interference ratio C/I(b) judged at the sixth step S(6) to be equal to or greater than the second allocation threshold level and sends to the mobile unit 25 the mobile power control value. The mobile unit 25 checks at a twenty-second step S(22) whether or not the power control margin P(mar) is exceeded by the mobile power control value received from the base station 23. If the mobile power control value is greater than the power control margin, the mobile unit 25 uses at a twenty-third step S(23) the power control margin as a mobile power reduction value PR(m). If the mobile power control value is not greater than the power control margin, the mobile power control value is used at a twenty-fourth step S(24) as the mobile power reduction value as it is. At a twenty-fifth step S(25), the mobile power reduction value is reduced from the mobile transmission power.

It is possible at the twenty-first step to make the base station not send the mobile power control value to the mobile unit 25. In this event, the base station 23 deals with the twenty-second through the twenty-fourth steps and sends the mobile power reduction value to the mobile unit 25 for use in the twenty-fifth step.

Referring afresh to FIG. 6 and again to FIGS. 1 through 3, the base station 23 is operable as follows on selecting the j-th channel CH(j) at the thirteenth step S(13). Steps will be counted serially following the twenty-fifth step S(25) described in connection with FIG. 5.

Figure 6:
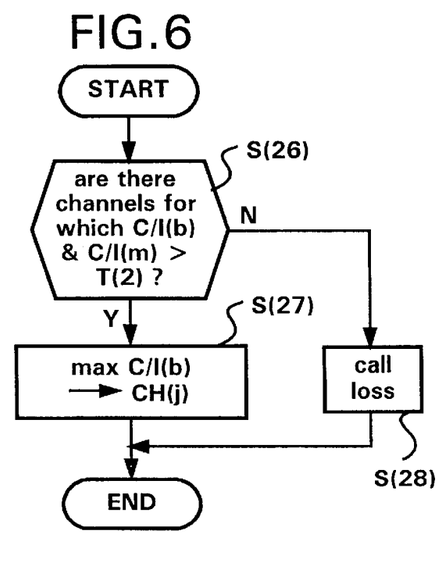
FIG. 6 shows a flow chart for use in describing operation as a first continuation of the flow chart depicted in FIG. 3.

At a twenty-sixth step S(26), the base station 23 checks whether or not there are candidate channels for which both the base and the mobile carrier to interference ratios C/I(b) and C/I(m) are not greater than the first allocation threshold level but are greater than the second allocation threshold level T(2). If at least one candidate channel is found, the base station 23 determines at a twenty-seventh step S(27) one of such candidate channels as the j-th channel that maximizes the base carrier to interference ratios. If no candidate channel is found, the base station 23 determines at a twenty-eighth step S(28) that the call is lost.

In connection with the twenty-seventh step, attention will be directed to the fact that the base station 23 transmits its downward radio signals with the predetermined base transmission power until determination of the allocated channel, namely, before control of the base transmission power. The base station 23 can therefore make the mobile unit 25 measure mobile interference levels I(m) in connection with the candidate channels and send the mobile interference levels back to the base station 23. In response, the base stattion 23 can select as the j-th channel one of the candidate channels that minimizes the mobile interference levels.

Figure 7:
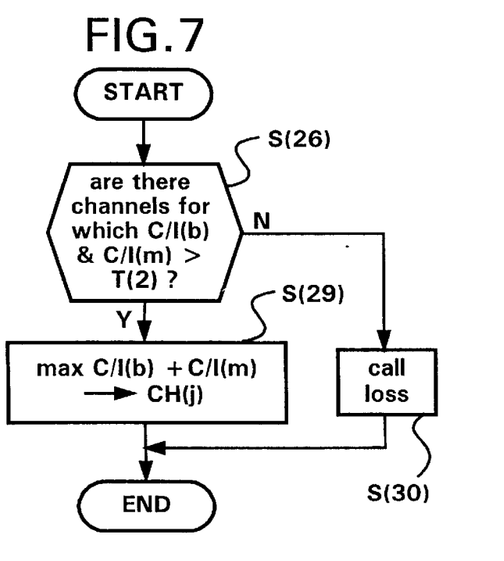
FIG. 7 shows a flow chart for use in describing operation of a second continuation of the flow chart of FIG. 3.

Turning to FIG. 7 with FIGS. 1 through 3 continuously referred to, the base station 23 is alternatively operable as follows an selecting the j-th channel CH(j) at the thirteenth step S(13). First, the base station 23 deals with the twenty-sixth step S(26) to search for the candidate channels. Subsequent steps will be counted serially following the twenty-eighth step S(28) described in conjunction with FIG. 6.

At a twenty-ninth step S(29), the base station 23 calculates ratio sums of the base and the mobile carrier to interference ratios C/I(b) and C/I(m) in connection with the candidate channels and determines one of the candidate channels as the j-th channel that maximizes the ratio sums. If no candidate channels are found, the call is judged at a thirtieth step S(30) as a call loss.

Referring anew to FIG. 8 and again to FIGS. 1 through 3, the j-th channel CH(j) is selected as follows depending on the circumstances. Steps will be counted consecutively following the thirtieth step S(30) described above.

Figure 8:
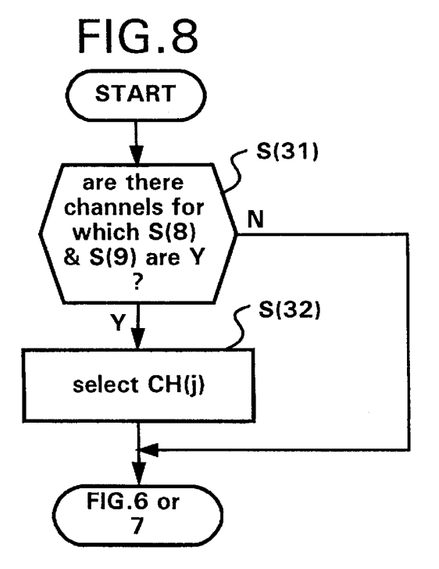
FIG. 8 shows a flow chart for use in describing operation in a third continuation of the flow chart depicted in FIG. 3.

At a thirty-first step S(31), the base station 23 checks whether or not there are subcandidate channels in connection with which the base carrier to interference ratios C/I(b) are equal to or greater than the first allocation threshold level T(1) and the mobile carrier to interference ratios C/I(m) are not less than the second allocation threshold level T(2). At a thirty-second step S(32), the base station 23 determines any one of the subcandidate channels as the communication channel. It is possible on so determining one of the subcandidate channels to proceed to an algorithm which is similar to that illustrated with reverence to FIG. 6 or 7 and in which each of the base or the mobile carrier to interference ratios may be equal to the second allocation threshold level. If no subcandidate channels are found, the base station 23 is operable in accordance with such an algorithm.

Figure 9:
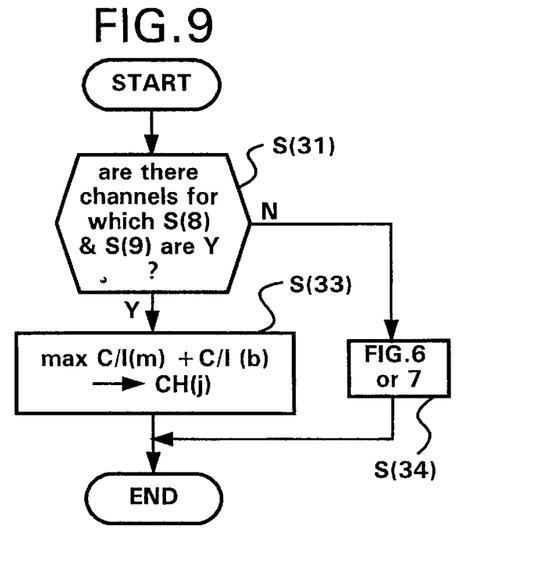
FIG. 9 shows a flow chart for use in describing operation as a fourth continuation of the flow chart of FIG. 3.

Turning to FIG. 9 with FIGS. 1 through 3 and 8 continuously referred to, the base station 23 is alternatively operable as follows after the thirty-first step S(31). Steps will be counted sequentially following the thirty-second step S(32).

At a thirty-third step S(33), the base station 23 calculates ratio differences between the base and the mobile carrier to interference ratios C/I(b) and C/I(m) by subtracting one from another as regards the subcandidate channels and selects one of the subcandidate channels as the j-th channel CH(j) that maximizes the ratio differences. If no subcandidate channels are located, the base station 23 proceeds at a thirty-fourth step S(34) to the algorithm described in connection with FIG. 8 with remarks.

Figure 10:
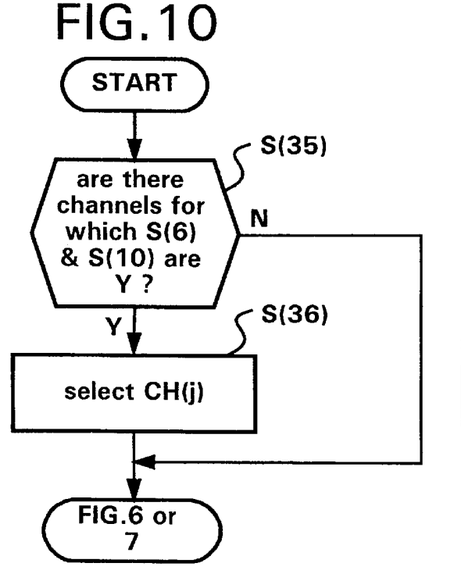
FIG. 10 shows a flow chart for use in describing operation of a fifth continuation of the flow chart depicted in FIG. 3.

Referring to FIG. 10 with FIGS. 1 through 3 continuously referred to, the base station 23 is operable as follows under a different circumstance. Steps will be counted consecutively following the thirty-fourth step S(34) described above.

At a thirty-fifth step S(35), the base station 23 checks whether or not there are subcandidate channels in connection with which the case carrier to interference ratios C/I(b) are equal to or greater than the second allocation threshold level T(2) and the mobile carrier to interference ratios C/I(m) are not less than the first allocation threshold level T(1). If the subcandidate channel or channels are found, the base station 23 can select at a thirty-sixth step S(36) any one of the subcandidate channels as the j-th channel CH(j). Either on so selecting the j-th channel or if no such subcandidate channels are found, it is possible for the base station 23 to proceed to the algorithm described in conjunction with FIG. 8, namely, described with reference to FIG. 6 or 7 with remarks.

Figure 11:
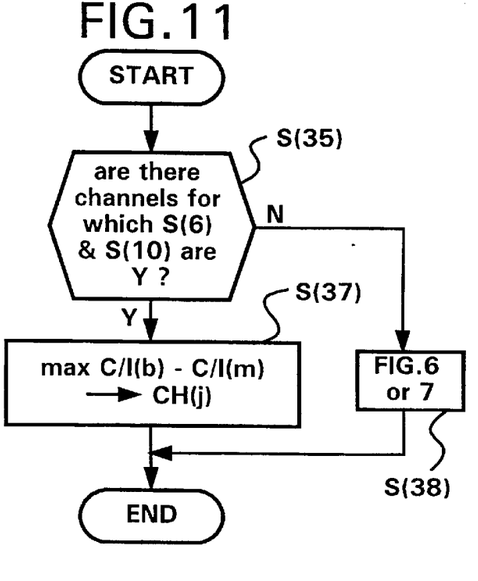
FIG. 11 shows a flow chart for use in describing operation as a sixth continuation of the flow chart of FIG. 3.

Turning to FIG. 11 with FIGS. 1 through 3 and 10 continuously referred to, the base station 23 is alternatively operable as follows after the thirty-fifth step S(35). Steps will be counted serially following the thirty-sixth step S(36) described above.

When the subcandidate channel or channels are found, the base station 23 calculates at a thirty-seventh step S(37) ratio differences by subtracting each of the mobile carrier to interference ratios C/I(m) from each of the base carrier to interference ratios C/I(b) as regards the subcandidate channels. At this step, the base station 23 selects one of the subcandidate channels as the j-th channel CH(j) that maximizes the differences. When no subcandidate channels are found, the base station 23 executes at a thirty-eighth step S(38) the algorithm described in conjunction with FIG. 8.

Figure 12:
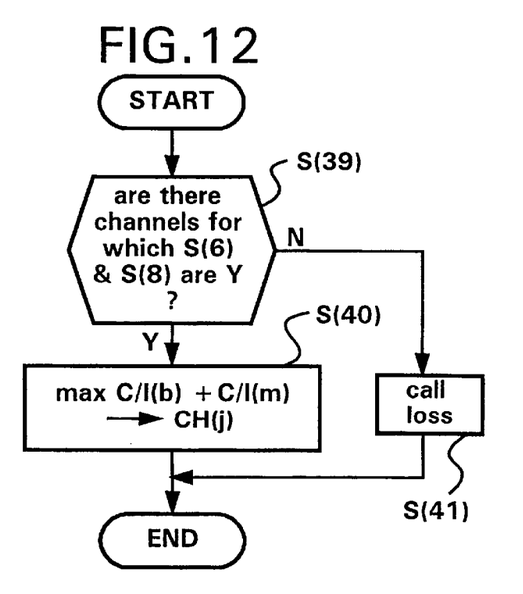
FIG. 12 shows a flow chart for use in describing operation as a seventh continuation of the flow chart of FIG. 3.

Referring now to FIG. 12, the base station 23 is operable as follows instead of algorithms described with reference to FIGS. 6 through 11. Steps will be counted consecutively following the thirty-eighth step described in the foregoing.

At a thirty-ninth step S(39) which it is possible to understand to follow the twelfth step S(12), the base station 23 checks whether or not there are candidate channels in connection with which the base and the mobile carrier to interference ratios C/I(b) and C/I(m) are both equal to or greater then the second allocation threshold level T(2). If such candidate channels are found, the base station 23 calculates at a fortieth step S(40) ratio sums of the base and the mobile carrier to interference ratios used in the thirty-ninth step and selects one of the candidate channels as the j-th channel CH(j) that maximizes the ratio sums. If no candidate channels are located, it is determined at a forty-first step S(41) that the call is lost.

While this invention has thus far been described in specific conjunction with a single preferred embodiment thereof and various modifications, it will now be readily possible for one skilled in the art to put this invention into effect in various other manners. For example, it is possible to implement various steps of the flow charts by a microprocessor in the cellular mobile communication network, the base stations and the mobile units used therein, a microcellular mobile communication network, and central base stations for use therein.

What is claimed is:

1. A method for allocating to a call, in an allocating order common to the cells of a mobile communication network, a communication channel from a plurality of radio channels, said network comprising a base station in each cell of a plurality of cells and a mobile unit in said each cell, said method comprising the steps of:

measuring at said base station base carrier to interference ratio and at said mobile unit mobile carrier to interference ratio;

selecting a first communication channel whose said measured base carrier to interference ratio exceeds a second allocation threshold level which is a required threshold level determined by the base carrier to interference ratio and said mobile carrier to interference ratio;

measuring at said mobile unit mobile carrier to interference ratio of said first communication channel at said base station;

selecting a second communication channel whose said measured mobile carrier to interference ratio exceeds said second allocation threshold level;

allocating a third communication channel that first exceeds a first allocation threshold level determined by a sum of a power control margin and said second allocation threshold level determined by said base carrier to interference ratio and said mobile carrier to interference ratio in said second communication channel;

allocating, when said third communication channel is not available, a fourth communication channel that is not less than said second allocation threshold level; and controlling said base and said mobile transmission power in consideration of said base carrier to interference ratio and said mobile carrier to interference ratio.

2. A method as claimed in claim 1, further comprising the step of measuring at said base station interference signal levels of said communication channels, wherein said step of allocating of a fourth one of said communication channels comprises the steps of:

selecting one of said communication channels that is not less than said second allocation threshold level; and allocating, as said fourth communication channel, one of said communication channels that minimizes said interference signal levels.

3. A method as claimed in claim 1, wherein said step of allocating a fourth communication channel comprises the steps of:

selecting ones of said communication channels that are not less than said second allocation threshold level;

calculating sum values, each as a sum of one of said base carrier to interference ratios and one of said mobile carrier to interference ratios, both of which do not exceed said first allocation threshold level and are not less than said second allocation threshold level; and allocating, as said fourth communication channel, one of said communication channels that maximizes said sum values.

4. A method as claimed in claim 1, wherein said step of allocating a fourth communication channel comprises the step of allocating, as said fourth communication channel, a communication channel having one of said base carrier to interference ratios and one of said mobile carrier to interference ratios that exceeds said first allocation threshold level and that is not less than said second allocation threshold level, respectively.

5. A method as claimed in claim 4, wherein said step of allocating a fourth communication channel comprises the steps of:

selecting ones of said communication channels that have said base carrier to interference ratios exceeding said first allocation threshold level and said mobile carrier to interference ratios not less than said second allocation threshold level;

calculating difference values, each as one of said mobile carrier to interference ratios minus one of said base carrier to interference ratios that is not less than said second allocation threshold level and that exceeds said first allocation threshold level, respectively, and allocating, as said fourth communication channel, one of said communication channels that maximizes said difference values.

6. A method as claimed in claim 1, wherein said step of allocating a fourth communication channel comprises the step of allocating, as said fourth communication channel, a communication channel having said mobile carrier to interference ratio and said base carrier to interference ratio that exceeds said first allocation threshold level and that is not less than said second allocation threshold level, respectively.

7. A method as claimed in claim 6, wherein said step of allocating a fourth communication channel comprises the steps of:

selecting ones of said communication channels that have said mobile carrier to interference ratios exceeding said first allocation threshold level and said base carrier to interference ratios not less than said second allocation threshold level;

calculating difference values, each as one of said base carrier to interference ratios minus one of said mobile carrier to interference ratios that is not less than said second allocation threshold level and that exceeds said first allocation threshold level, respectively; and allocating, as said fourth communication channel, one of said communication channels that maximizes said difference values.

8. A method as claimed in claim 1, wherein said step of allocating a fourth communication channel comprises, when the communication channels having said one of base carrier to interference ratios and the communication channel having said one of mobile carrier to interference ratios are not available, the steps of:

selecting ones of said communication channels that are not less than said second allocation threshold level;

calculating sum values, each as a sum of one of said base carrier to interference ratios and one of said mobile carrier to interference ratios, both which are not less than said second allocation threshold level; and allocating, as said fourth communication channel, one of said communication channels that maximizes said sum values.

9. A method as claimed in claim 1, wherein, after said communication channel is allocated, said controlling step comprises the steps of calculating at said mobile unit a base power control value by a used one of said mobile carrier to interference ratios used in allocating said communication channel minus said second allocation threshold level and calculating at said base station a mobile power control value by a used one of said base carrier to interference ratios used in allocating said communication channel minus said second allocation threshold level, checking at said base station and at said mobile unit whether or not said base and said mobile power control values are greater than power control margin, using at said base station and said mobile unit said power control margin as a base and a mobile power reduction value when said base and said mobile power control values are greater than said power control margin, using at said base station and said mobile unit said base and said mobile power control values as said base and said mobile power reduction values, respectively, when said base and said mobile power control values are not greater than said power control margin, and reducing at said base station and said mobile unit said base and said mobile power reduction values from said base and said mobile transmission powers, respectively.

* * * * *